United States Patent
Royall, Jr. et al.

(10) Patent No.: US 7,451,094 B2
(45) Date of Patent: Nov. 11, 2008

(54) METHOD FOR ELECTRONICALLY SURVEYING PROSPECTIVE CANDIDATES FOR ADMISSION TO EDUCATIONAL INSTITUTIONS AND ENCOURAGING INTEREST IN ATTENDING

(75) Inventors: William A. Royall, Jr., Richmond, VA (US); Edward B. Freeman, III, Richmond, VA (US); Elizabeth W. Clark, New York, NY (US)

(73) Assignee: Royall & Company, Richmond, VA (US)

( * ) Notice: Subject to any disclaimer, the term of this patent is extended or adjusted under 35 U.S.C. 154(b) by 1262 days.

(21) Appl. No.: 09/931,749

(22) Filed: Aug. 20, 2001

(65) Prior Publication Data

US 2002/0032600 A1    Mar. 14, 2002

Related U.S. Application Data

(60) Provisional application No. 60/226,091, filed on Aug. 18, 2000.

(51) Int. Cl.
    *G06Q 99/00* (2006.01)
(52) U.S. Cl. .......................................... 705/1
(58) Field of Classification Search ............... 705/1
    See application file for complete search history.

(56) References Cited

U.S. PATENT DOCUMENTS

| | | | |
|---|---|---|---|
| 5,842,195 A * | 11/1998 | Peters et al. ................... 707/1 |
| 6,093,026 A * | 7/2000 | Walker et al. ................ 434/322 |
| 6,151,581 A * | 11/2000 | Kraftson et al. ................ 705/3 |
| 6,189,029 B1 * | 2/2001 | Fuerst ........................ 709/217 |
| 6,233,564 B1 * | 5/2001 | Schulze, Jr. ................... 705/14 |
| 6,236,975 B1 * | 5/2001 | Boe et al. ...................... 705/7 |
| 6,250,930 B1 * | 6/2001 | Mintz ........................ 434/323 |
| 6,529,878 B2 * | 3/2003 | De Rafael et al. ............. 705/14 |
| 6,539,392 B1 * | 3/2003 | Rebane ....................... 707/101 |
| 6,826,540 B1 * | 11/2004 | Plantec et al. ................. 705/10 |
| 7,171,567 B1 * | 1/2007 | Bayer et al. ................. 713/193 |
| 2001/0032115 A1 * | 10/2001 | Goldstein .................... 705/10 |
| 2002/0002482 A1 * | 1/2002 | Thomas ...................... 705/10 |
| 2002/0007303 A1 * | 1/2002 | Brookler et al. .............. 705/10 |
| 2002/0049727 A1 * | 4/2002 | Rothkopf ...................... 707/1 |
| 2002/0052774 A1 * | 5/2002 | Parker et al. ................. 705/10 |

OTHER PUBLICATIONS

Sanoff, Alvin P.; Glastris, Kukula, The Consulting game: Schools turn to outside help to target and select students. US News & World Report, v119, n11, p. 119(4), Sep. 18, 1995.*

(Continued)

*Primary Examiner*—Jonathan Ouellette
(74) *Attorney, Agent, or Firm*—Duane Morris LLP

(57) ABSTRACT

Methods of marketing educational services which include the electronic but essentially free form survey of candidates found in the data base of an educational institution. Metrics are established for survey responses and interest is assessed for attending the educational institutions. The methods include surveying by mail with an option to respond by e-mail, surveying entirely by e-mail, and surveying alternatively by mail/e-mail. Methods are also disclosed for stimulating interest including personalized invitations to attend events sponsored by the institution. Information provided by the candidate in response to any survey and/or any invitation is used to automatically update the data base and to customize and personalize further communications with each candidate.

9 Claims, 9 Drawing Sheets

OTHER PUBLICATIONS

Schillewaert, Niels; Langerak, Fred; Duhamel, tim, "Non-probability sampling for WWW surveys: a comparison of methods." Journal of the Market Research Society, Oct. 1998.*

Noel-Levitz (www.noellevitz.com, Retrieved from the Internet Archive Wayback Machine <www.archive.org>, Strategies Newsletter Winter 1998 and Spring 1998).* www.elisten.com.*

* cited by examiner

Name, we've appreciated your interest in *University*. Do you still intend to apply to *University*, or do you need another application or any other information?

○ Yes, I will be applying

○ No, thank you. I will not be applying to *University*

○ I am still undecided

☐ Please send me another application

☐ Please e-mail me, I have another question

*Name*, if you have 2 more minutes, I would appreciate it very much if you you would take a look at the questions below and respond where appropriate.

Thank You.

How much influence does each of the following factors have on your decision to apply to *University*?

Not important at all / Not very important / Somewhat unimportant / Neutral / Somewhat Important / Important / Very Important ○ ○ ○ ○ ○ ○ ○ Campus is safe and secure
○ ○ ○ ○ ○ ○ ○ You offer majors that interest me
○ ○ ○ ○ ○ ○ ○ You have an athletics program that fits my needs
○ ○ ○ ○ ○ ○ ○ Extracurricular activities that I enjoy are available
○ ○ ○ ○ ○ ○ ○ Admission staff is accessible
○ ○ ○ ○ ○ ○ ○ Faculty care about students as individuals
○ ○ ○ ○ ○ ○ ○ University prepares me for a career that interests me What other schools will you be applying for?

*FIGURE 2a*

Student Info Correction...

| Name | (First Name) |
| | (Preferred Name) |
| | (Middle Name) |
| Last Name | (Last Name) |
| Address | (Address 1) |
| | (Address 2) |
| City | (City) |
| AL | (Zip) |
| ###-###-#### | (Phone) |
| | (E-Mail Address) |
| | (1st Academic Interest) |
| | (2nd Academic Interest) |

Thank you again, *Name*, for taking the time to complete this survey.

If you would like any more information on our school, please visit our web site at *www.university.edu*, or e-mail us at *Universitysurvey@admissionsinfo.com*

[ Submit Information... ]     [ Clear Form... ]

*FIGURE 2b*

*Name*
_____

From: *Name*
Sent: *Date*
To: *Name*
Cc: *Name*
Subject: *University*

I'm emailing because I haven't received your application yet. I've set up a special web page to help me make sure you have everything you need. Would you please take a moment to visit http://www.admissionsinfo.com/university/web_survey/university.asp?i=3.0XX000000547.7
Thank You!

*Name*
*Title*
*University*

*FIGURE 4*

Bill, thank you for taking the time to fill out your survey.

We look forward to communication with you in the coming weeks; and making your *University* experience more complete.

For more information, please visit our web site.

*FIGURE 5*

| | |
|---|---|
| *Name* | |
| From: | *Name* |
| Sent: | *Date* |
| To: | *Name* |
| Cc: | *Name* |
| Subject: | *University* |

| | |
|---|---|
| From: | *Name* |
| Sent: | *Date* |
| To: | *Name* |
| Cc: | *Name* |
| Subject: | *University* |

We would like to invite you to attend An Evening with *University* in *City* on *Date*. You and your parents can get helpful information about admissions, answers to financial aid questions, and the oppurtunity to speak with *University* alumni at this event.

I think you and your family will have a great time, and want to make sure you don't miss out. Please click on the link below to let me know if you'll be attending.

Thanks,
*Name*
*Title*
*University* http://www.admissionsinfo.com/university/web survey/university.asp?i=3.0XX000000547.7

*FIGURE 8*

METHOD FOR ELECTRONICALLY SURVEYING PROSPECTIVE CANDIDATES FOR ADMISSION TO EDUCATIONAL INSTITUTIONS AND ENCOURAGING INTEREST IN ATTENDING

RELATED APPLICATIONS

The application claims priority from U.S. provisional patent application Ser. No. 60/226,091 filed on Aug. 18, 2000 as well as from pending U.S. application Ser. No. 09/633,897 filed Aug. 7, 2000 and the priority of U.S. provisional patent application Ser. No. 60/205,558 filed May 22, 2000.

BACKGROUND OF THE INVENTION

This invention relates to methods for surveying candidates who may be interested in enrolling in an institution of higher education such as a college or university, and for encouraging their attendance.

Increasingly, colleges and universities compete with other institutions to attract and maintain the interest of the best and brightest candidates. The method of the present invention provides real time feedback in a prolonged multi-step sales process for what is a very large investment for the candidates. The present invention enables institutions to gage the interest and suitability of candidates at various points in this process and to increase attendance by personalization and customization of the contacts with the candidate.

The typical pattern of recruitment and admission may be considered in the context of the traditional academic year. A candidate may begin making inquiries in his or her freshman year in high school, or in some cases even earlier. However, the typical high school student generally begins to investigate schools soon after their freshman year. The process of investigation and evaluation continues through the summer and may accelerate in the fall of the student's senior year. During the fall and winter of the high school student's senior year, the candidate may then apply to one or more institutions. However, it is also not uncommon for a candidate to postpone application for one or more years after completion of high school. Thus, the period of time during which the candidate is considering his or her options is often prolonged.

The difficult task of an educational institution, in the months or even years between an initial inquiry and actual matriculation, is to maintain a candidate's continuing interest in the institution and its programs. In addition, it is highly desirable for the institution to evaluate the candidate's continuing suitability for enrollment.

As explained in more detail in co-pending application Ser. No. 09/633,897, the disclosure of which is hereby incorporated herein by reference, educational institutions often receive inquiries from prospective student candidates ("candidate") expressing an interest in attending the institution. Information about the candidates is generally maintained in a data base called an "inquiry pool", and may include the candidate's contact information, age, geographic area, scholastic and extracurricular interests ethnicity, and other data potentially relevant to the candidate's interest in, or suitability for, attending the institution.

Information about a potential candidate may be derived from many other sources such as the Educational Testing Service, Educational Opportunity Service, National Research Center for College and University Admissions (NRCCUA) or other regional or national information sources. Information from whatever source is desirability added to the data base of candidates.

Historically, a college or university may undertake to mail applications, brochures or information to all or some of the candidates in its inquiry pool in order to maintain or ascertain the candidates' continuing interest in the institution or its programs. The cost for such direct mailings can be very large, particularly where the approach must be broad based because of the spectrum of potential interests of the candidates receiving such a common mailing.

In order to manage costs, colleges or universities may hire telephone polling services to contact candidates in their inquiry pool to ascertain the qualification and continuing level of interest of each candidate. If a candidate is no longer interested in attending the college or university, or is clearly not qualified for admission, the institution may remove the candidate from its list of interested candidates. This method may result in some savings in subsequent mailings. However, the financial cost of such telephone polling service can be expensive and may amount to more than two dollars per candidate surveyed. Furthermore, it may take the telephone polling service up to two months to contact each candidate in a particular inquiry pool.

Other attempts to reduce the cost of providing candidates with promotional materials have involved the use of electronic mail or "e-mail". While less expensive, e-mail has not proven to be a viable medium for the solicitation of candidates for applications for enrollment, principally because e-mail is impersonal when widely distributed and too time consuming and therefor expensive if personalized and sent one at a time. While applications for enrollment may be forwarded in this manner, this approach lacks the customization and personalization which has been found necessary to gain the attention of candidates over the prolonged period of decision making.

The present invention provides a viable alternative to known expensive and time consuming methods of assessing and maintaining a candidate's interest in a particular institution. In its various embodiments, the method provides an efficient and cost effective method for surveying and evaluating the interest of candidates that are either included in an institution's inquiry pool or who have been identified from various other regional or national information sources. It accepts a wide range of personal information, analyzes the responses and thus centralizes the response methodology from free form to systematic. Through the use of weblinks, the candidate himself effectively introduces his own profile data into the data base, eliminating the need for human intervention and thus facilitating the updating of the data base on a mass basis. The dynamic updating of the data base permits a tailored response for each candidate at each contact, thereby maintaining the essence of personal communication, the most effective communication in a multi-step sales process.

The present invention also facilitates the segmentation of particular candidates within a larger pool according to specific selection criteria that are established by the particular institution, and thus permits a degree of customization unknown in the field. This customization dramatically increases the interest and thus the response of the candidates to the communications from the institution.

In addition, the present invention provides a method of ascertaining a candidate's level of interest in the institution, in real time and repeatedly. Metrics are established for the diverse essentially free form information provided by the candidate and further communications with the candidate are dynamically adapted as a function of the candidate's previous responses and information assembled from other sources.

The time necessary for an institution to evaluate the level of interest of all candidates is significantly reduced. This allows an institution to identify, and target, certain candidates based on specific interests, qualifications or other criteria. With increased knowledge of the degree of interest of the candidates in various segments of the pool, better decisions as to marketing strategy may be made.

Accordingly, it is an object of the present invention to obviate many of the deficiencies of known methods of marketing educational services and to provide a novel method of soliciting information from candidates for enrollment at educational institutions.

It is another object of the present invention to provide a novel and highly effective method for economically determining the interest of selected candidates as an aid in the multi-step marketing process.

It is a further object of the present invention to provide a novel method of incentivizing candidates to provide additional information in a form which may be used to in the customizing and personalizing of further communications, thereby stimulating the candidate's continued interest in the institution.

It is yet a further object of the present invention to provide a novel method of evaluating the interest and suitability of candidates over the course of a prolonged solicitation, largely without human intervention.

It is still another object of the present invention to provide a personalized and secure means of contacting and surveying potential candidates to assess their interest in a particular institution, while preserving the integrity of the survey.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIGS. 2a and 2b are illustrative web pages customized for an institution and personalized for the candidate and soliciting response to an interactive web based survey.

FIG. 4 is an illustrative example of personalized e-mail used in the method of the present invention.

FIG. 5 is an illustrative example of a personalized acknowledgment used in the method of the present invention.

FIG. 8 is an illustrative example of a personalized e-mail used to invite a candidate to an institution sponsored event.

DESCRIPTION OF PREFERRED EMBODIMENTS

The present invention uses a novel combination of profiling and surveying techniques to measure and assess the interest of potential candidates in a cost effective and timely manner. The method allows an institution to identify selected characteristics of potential candidates. Once these characteristics have been identified, the pool of potential candidates may then be further segmented into specific subgroups based on selection criteria identified by the educational institution. These specific candidate subgroups can then be targeted and surveyed.

Figure 1:
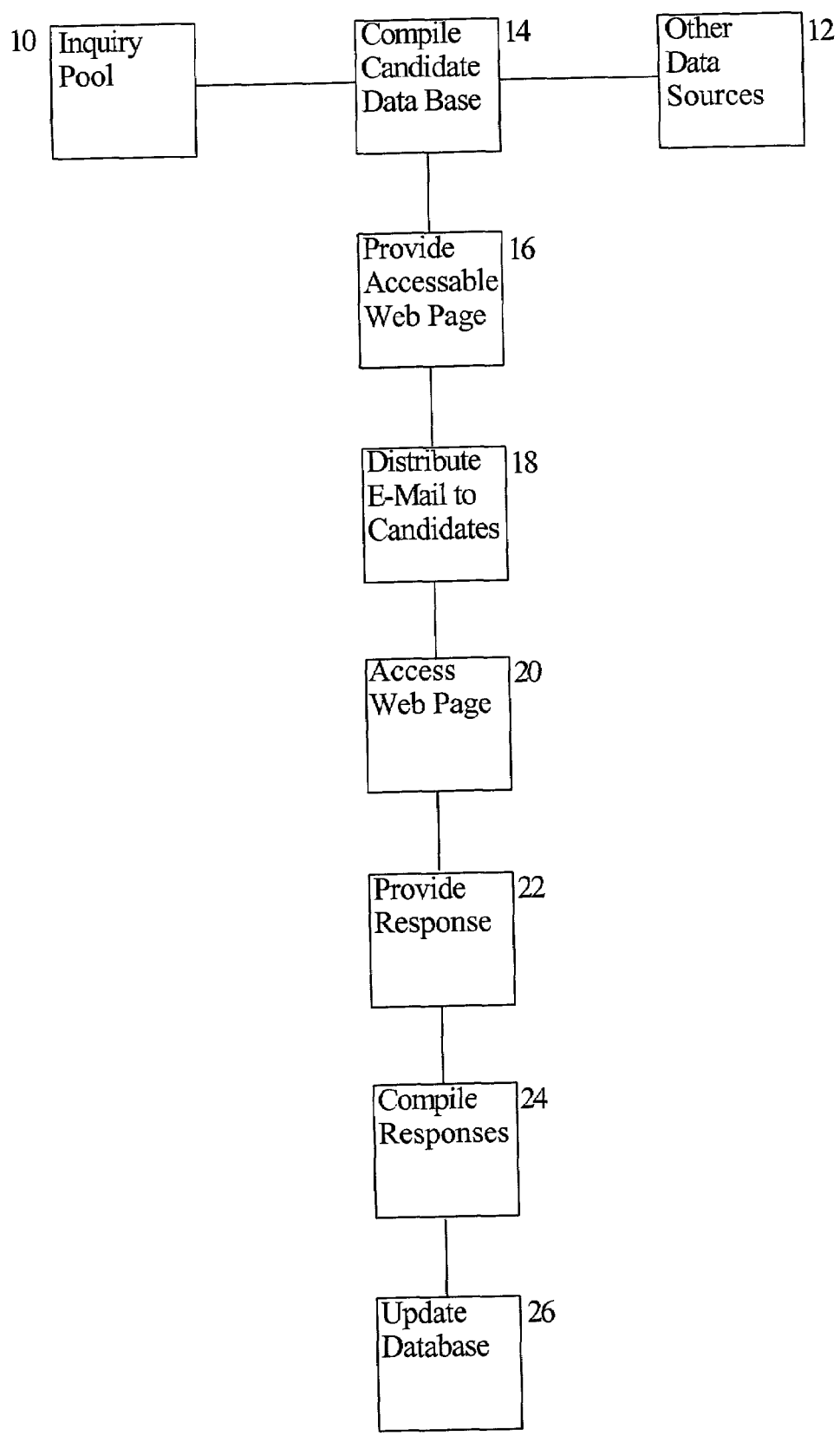
FIG. 1 is a flow chart illustrating the major steps in one embodiment of the present invention.

A simplified illustration of a method for electronically surveying interested candidates is shown in FIG. 1. According to this method, a list of candidates may be obtained from the educational institution's existing inquiry pool 10 or from such other available data sources such as the Educational Testing Service, Educational Opportunity Service, NRCCUA or other national or regional data source 12. Although the quantity and quality of such data may vary significantly, it is generally accessible in a variety of formats so that the data may be compiled as a candidate data base in the institution's preferred format 14.

A single web site may then be created for an individual institution 16 with the web page constructed in a manner well known in the art to include one or more interactive electronic surveys or element forms. The web page may be used to provide an interactive experience to the candidate, with a back end logic tree responding to user input to guide the candidate through the site. The data supplied by the candidate may be actively processed and the site continuously updated until the visit is concluded.

Alternatively, a single web site may be created and organized so that information pertaining to a particular educational institution is contained within a particular area thereof. This alternative may have particular utility for institutions that share a common conference identity or affiliation such as Ivy League, Big Ten, or SEC, or who have other types of formal or informal cooperative arrangements. In such an embodiment, each particular educational institution may have its own web page within a larger overall web site without commingling of the data base of one educational institution with the data base of any other educational institution.

Ideally, the web based survey form may be tailored to the needs of a particular institution and may be used to evaluate the interest of student candidates in attending the particular educational institution. The web page can contain a customized survey that can be used to identify critical factors in a candidates interest in the institution. As shown for example in FIGS. 2a and 2b, the look and feel of a web page may be varied by using customized text and graphics that are unique to the institution. Furthermore, the web site and related documentation can be customized in response to one or variables identified in the data base to provide different graphical images and copy. Thus, students who have indicated an interest in athletics may be directed to a portion of the site customized with copy and images relating to the institution's athletic programs. Similarly, students expressing interest in a particular academic program or interest may be directed to a web page that has been customized for that particular program.

The web site can also provide an interactive experience to the candidate by the use of a back end logic tree that responds to user input to update the site as the candidate is guided through the site.

As illustrated in FIGS. 2a and 2b, the candidate may be asked in a typical survey form to evaluate such factors as: "Campus safe and secure"; "You [the educational institution] offer majors that interest me"; "You [the educational institution] have an athletics program that fits my needs"; "Extracurricular activities that I enjoy are readily available"; "Admission staff is accessible"; "Faculty care about students as individuals"; "[educational institution] prepares me for a career that interests me." These survey questions may be tailored to the needs and interests of the institution and may further be adapted to the various segments or sub-groups of candidates The various survey questions may also be presented in such a way that the educational institution can quantify or rank the importance of each factor to the student candidate over a predetermined spectrum of responses. For example, as shown in FIGS. 2a and 2b, a candidate may be asked to indicate the relative importance of each individual factor as: "Not important at all"; "Not very important"; "Somewhat unimportant"; "Neutral"; "Somewhat important"; "Important"; or "Very important". Other combinations of response, with more or less choices, may also be provided.

The candidate may also be afforded an opportunity to provide additional personal information or otherwise update the information contained in the data base. Again with reference to FIGS. 2a and 2b, the web based survey form may also includes a section that allows the student candidate to complete and/or update his/her personal information, such as full name, preferred name, address, phone number, ZIP Code, academic interest, etc. The web based survey form may also include other factors to help the educational institution evaluate the interest level of the student candidate, concluding with an opportunity to request additional information or specifically solicit a follow up contract from a representative.

As shown in FIG. 1, the results of all of the web based surveys may then be compiled 24. This compilation of results may occur as frequently as desired by the educational institution or may occur only after some specific period of time or upon the occurrence of some defined triggering event. The results may then be used to update the information educational institution's candidate data base or inquiry pool 26.

Figure 3:
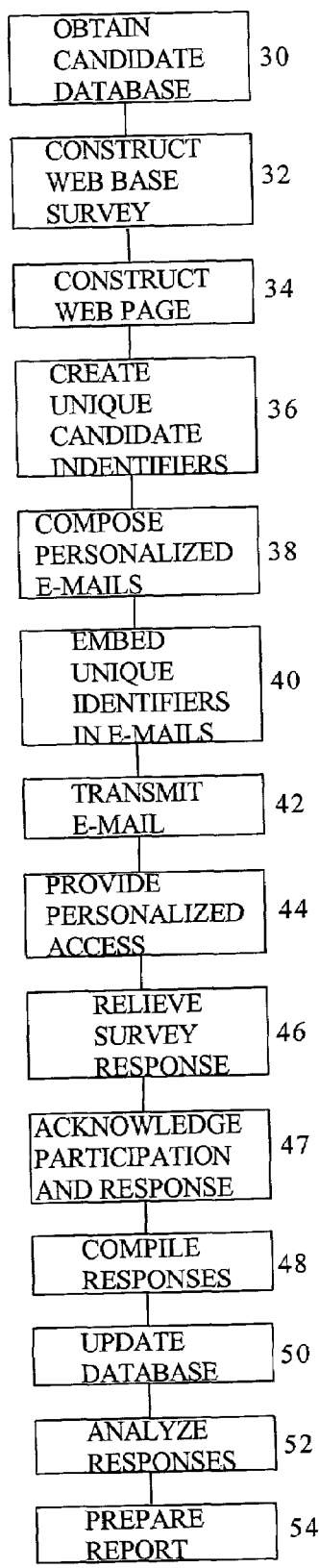
FIG. 3 is a flow chart illustrating one embodiment of a method of electronically surveying candidates.

The ability to attract to maintain and evaluate the interest of particular candidates is increasingly of critical importance to an institution's recruiting efforts. The ability to periodically contact and assess the continued interest and suitability of candidates enables an institution to control its recruiting costs and to evaluate the effectiveness of its various recruiting and outreach strategies and methods. FIG. 3 schematically illustrates a more detailed embodiment of the present method as it may be used to evaluate the continued interest of student candidates in a particular educational institution using personalized e-mail and a unique candidate identifier.

As shown in FIG. 3, the initial step is that obtaining a candidate database from an inquiry pool 10 or other data source 30. A customized web based survey form may then be created for use by prospective candidates 32. As before, this web based survey form may be designed to determine a candidate's level of interest in a particular educational institution and may also provide candidate's with an opportunity to provide additional or updated information. A web page providing remote access to the survey may then be constructed 34.

In order to provide individual security and to preserve the integrity of the survey process, a unique access number may then be created for each candidate 36. and required for online responses. The use of a unique access number ensures that each candidate may only access his/her own personal information. In practice, access numbers should be randomly, and not sequentially assigned. Furthermore, the individual access identifier should also be of sufficient length that the chances of unauthorized access to a candidate's information is minimized.

Once the web page and web based survey have been prepared, the next step, is to compose a personalized e-mail to selected candidates 38. This e-mail may come directly from a dean, director of admissions, coach or other readily identifiable representative of the institution. FIG. 4 is an illustrative e-mail inviting the candidate to click on a hyperlink that will allow he or she to complete the online survey.

The web address may be a regular web site address which has been provided with a special URL string unique to the candidate 40 so that clicking on the link accesses a web page that has been personalized for him in at least three separate section.

The e-mail may also be tailored to a specific academic, cultural or extracurricular interest of the candidate and may direct the candidate to a website which they can access.

The query string following the web address uses 16 characters to uniquely identify each student, school and communication. The assignments of query strings is randomly generated and far enough apart so that consecutive pages will not appear if a candidate replaces or varies digits or letters in the string. Similarly, a candidate who attempts to erase a web address query string will be directed to a web page that shows no access is available. The student who erases the entire URL string in an attempt to access the root server will be denied access.

The process is also completed on the web server and the codes and scripts are never exposed to the client in the browser. Once a candidate has completed a survey, further attempts to log on and enter multiple data sets or falsified data is not permitted. This protects the integrity of the survey and protects the candidate from others who may have access to the candidate's computer and may try to visit sites left in the computer's browser cache.

The e-mails are then transmitted to the candidates 42 and the web based survey is accessible to candidates using their personal identifiers 44. The individualized responses from the web survey can then be compiled 48 at a predetermined frequency, upon the occurrence of any selected triggering event, or at random intervals, automatically or upon specific command. The results of the survey may then be forwarded to the educational institution 52.

Many institutions are interested in identifying particular segments or categories of candidates. These categories may be identified based on certain shared characteristics or interests. In the case of an educational institution, a particular candidate category or segment may include those candidates with specific academic interests or qualifications, specific extracurricular interests or talents. Such categories may also include groups of individual candidates who share specific ethnic, financial or other demographic characteristics that may be of interest to an institution, business or government agency. The method permits an institution to solicit and monitor individualized responses from selected groups or sub groups of candidates. According to this method, an institution may solicit individualized responses from a broad array of potentially interested candidates.

The ability to establish personalized contact with candidates is an important component of the method. A personalized letter to members of each identified demographic group or subset of a larger mailing population may be developed with information earlier developed used to personalize each communication. Moreover, each candidate receives a personalized invitation to respond, rather than just another impersonal communication from a faceless institution. Because students are much more likely to respond to such shorter and personalized communications, the method thus produces an increased rate of response, which in turn improves the reliability and utility off the resulting data base.

Figure 6:
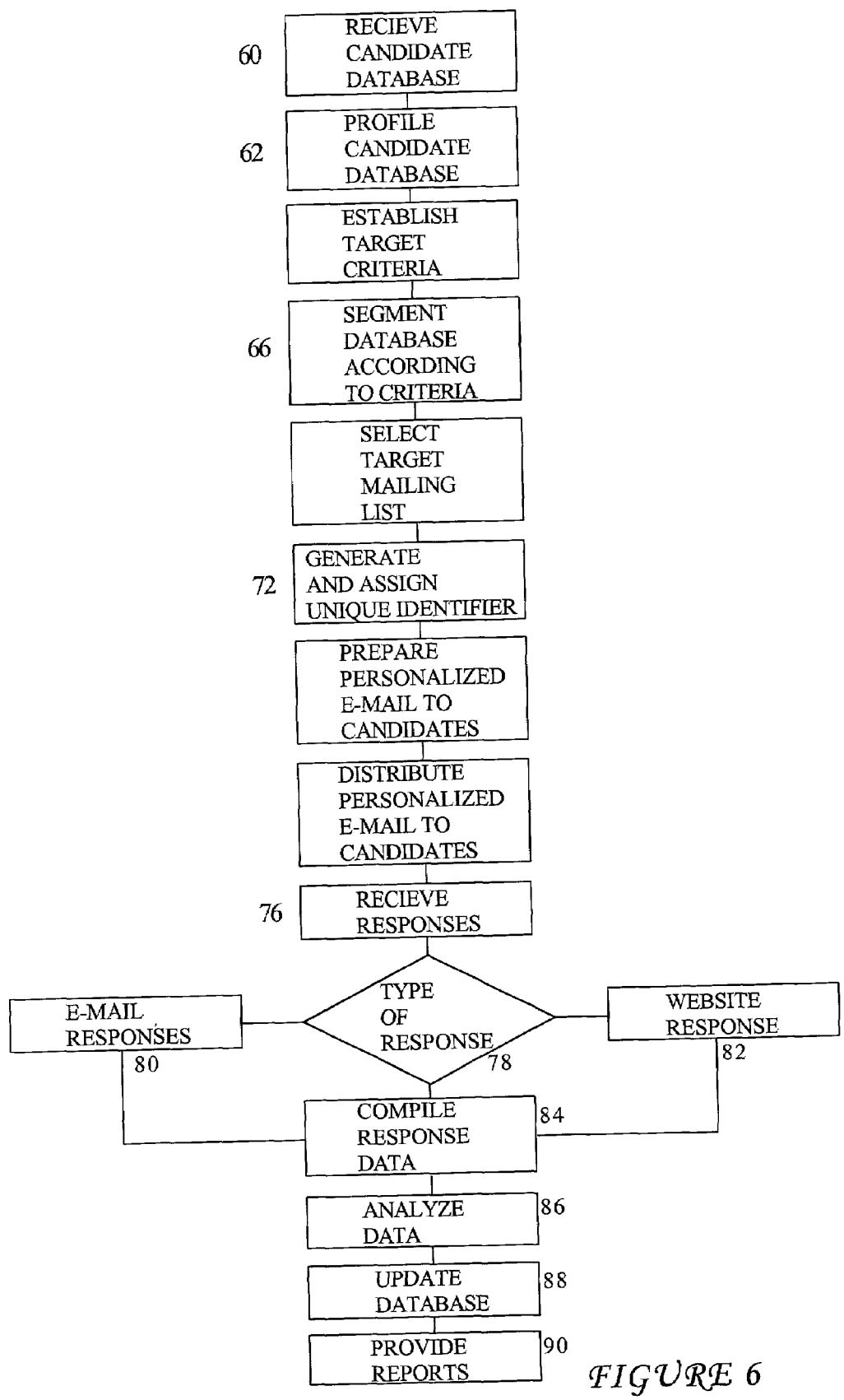
FIG. 6 is a flow chart illustrating an embodiment of the method for soliciting and compiling electronic survey response.

The method illustrated in FIG. 6 utilizes a novel combination of profiling and personalized communication to qualitatively evaluate list of prospective candidates identified in an inquiry pool or other data sources. The initial step of this particular method involves the receipt of a candidate data base derived from an inquiry pool or other data source 60. The data base may then be profiled according to specific criteria identified by the institution 62 as described in the aforementioned U.S. patent application Ser. No. 09/633,847.

The profiling technique allows an institution to identify (a) those candidates who are most likely to apply and (b) those students in which a particular institution has the greatest interest. The profiling of candidate data also provides an advance look into the candidate population.

The benefits of this profiling practice are at least threefold. First, the procedure enables a school to profile a selected population and examine the characteristics of each student in the selected population. Secondly, a pool of potential candidates may be segmented smaller groups into students who share certain selected characteristics. Thirdly, the method also allows the institution to select the particular groups of prospective students to target and contact based on the specific goals for student recruitment and response management that have been identified by the institution.

Once the data base has been be segmented according to characteristics 66, specific candidates with certain characteristics may then be targeted for a mailing lists. Each targeted candidate is then assigned a unique identifier as previously discussed and an e-mail is prepared that includes the unique identifier 72. A personalized e-mail may then sent to each identified candidate.

Once a response is received 76, the response may be categorized according to the means of response and may include an e-mail response 80 or web site response 82. The responses are then compiled 84, the data analyzed 86 and used to update the data base 88 and to provide a report to the institution 90.

Figure 7:
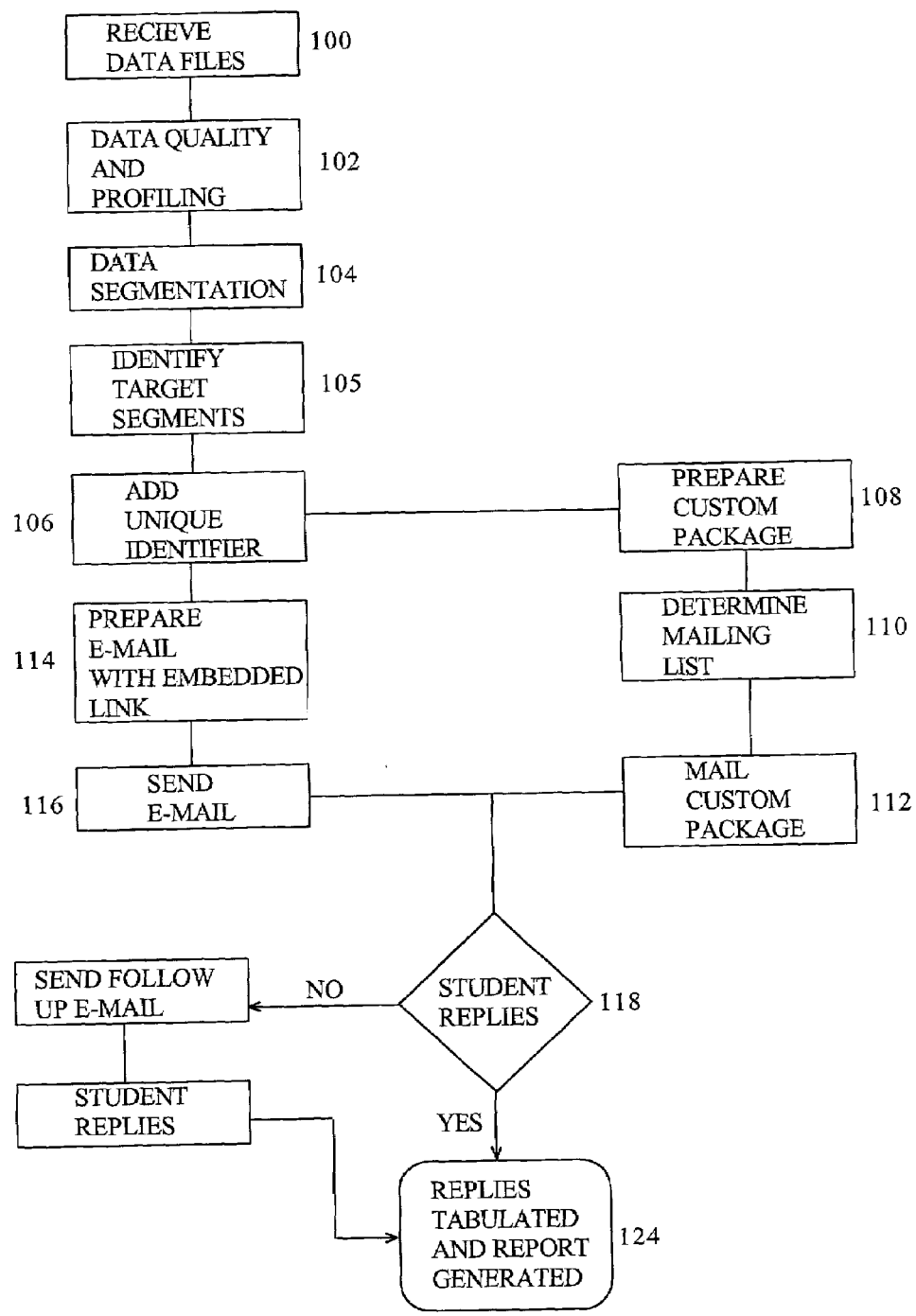
FIG. 7 is a flow chart of another embodiment of the method of the present invention.

The method of the present invention may also be used in conjunction with the traditional mail survey processes. As shown in the embodiment illustrated in FIG. 7, the process begins with the receipt of data files from one of more sources 100. The data base may then be profiled and checked for quality of the data 102. The data may then be profiled as previously discussed and quality checks may be performed to detect and eliminate duplicate records, address correction and standardization, correction of e-mail addressee and manipulation and customization of data fields.

The database may then be segmented based on criteria identified by the institution 104. Typically, this segmentation may be based on one or more elements including academic status, geographical location, ethnicity, academic interest, or field of study and scholastic achievement or extracurricular activity or interest. Once the data has been segmented a unique candidate identifier may be generated and added to each file 106.

According to this embodiment, a custom mailing package may be prepared for each segment 108. The content of the mailing package may be customized for various purpose. A mailing list of candidates may then be generated using the target data base 110. Once a mailing list is prepared, those candidates with an e-mail address are identified and an individualized e-mail may be generated for each candidate 114. This e-mail may contain a unique personal identifier and a hyperlink to a specific website location as illustrated in FIG. 4.

The hyperlink to the customized mailing package may then be sent to recipients by either traditional physical distribution including the mail or parcel service 112 or by e-mail 116. The student may reply either by traditional means or electronically 118. This particular embodiment dramatically expands a prospective candidate's response options, e.g. the candidate may respond using the traditional means or by using the electronic web page. Alternatively, a candidate may elect to complete the electronic survey, print it out for editing and proofreading, and then mail it to the institution. Together, these various response options not only add to the distinctiveness of the process, but also enhance the chances of a positive response.

According to this method, a candidate who responds electronically, may receive a customized acknowledgment such as is illustrated in FIG. 5. Further, candidates who were provided with e-mails may be sent a follow up e-mail after a period of time. Once the candidate replies 112, the results may be tabulated and appropriate reports generated 124.

Using this method, an institution may also elect to provide candidates with one or more individual incentives to respond to an invitation or complete an and return a survey. These incentives may be chosen according to the characteristics of a particular candidate or segment and may include the offer of an expedited admission decision, a waiver of fees, or even priority consideration for financial aid. The incentives may be tailored to the particular institution. For example, the candidate may be offered the opportunity to download one or more electronic wallpapers reflecting various institutional motifs or themes. The responding candidate may also be invited to attend a athletic, cultural or educational event on campus. This additional targeted incentive may provide the needed impetus for the candidate to complete a survey or otherwise respond to an invitation.

In yet another embodiment the method may be adopted to provide candidates with individual invitations to attend or participate in various events. As illustrated in FIG. 8, a personalized e-mail can be sent to selected candidates inviting them to participate. The candidate may be afforded the opportunity to respond by e-mail web site RSVP or by traditional enclosed RSVP card. As with the other embodiments, the data provided by such RSVP may be used to update linked data bases.

The various embodiments of this method permit the real time monitoring of the survey process and periodic tracking of the number and quality of the responses. Based upon the tracking of this information, it is possible to provide a detailed analysis depicting the results of the survey process. These results may be analyzed in conjunction with existing data base profiling to show the school what segments of their mailing population responded well and which segments did not. This analysis may also provide the institution with a thorough documentation of the program's success in relation to their stated objectives, and demonstrates the useful, concrete and tangible results of the school's application program.

The various embodiments may be adapted to facilitate variety of customized monitoring approaches. The method may also provide an ability to concurrently monitor and evaluate student or candidate response and web site activity. The process and method also permits direct monitoring of a web site to determine who is visiting, the length of time spent and portions of the site that are visited. This monitoring can also provide a listing of recent visits or summary of selected performance criteria or averages. The method may also be adapted to permit the source data base to be updated automatically based on the candidate's response to the web based survey.

The present invention relates specifically to methods of assessing and stimulating the interest of candidates in enrolling in a colleges, universities or other institution of higher education. The choice of an institution represents an extraordinary expense and the sales process is a multiyear, multistep process. The use of information derived during this prolonged process to customize and personalize the future steps in the process greatly increase the effectiveness thereof.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for surveying candidates who may be interested in an educational institution comprising the steps of:
    (a) obtaining a list of candidates who are believed to have an interest in attending an education institution;
    (b) developing a data base relating to the candidates;
    (c) using the information in the data base to segment the candidates into one or more candidate segments based on one or more criteria established by the educational institutions;
    (d) establishing an Internet based web page containing a survey form;
    (e) preparing mailing package for each candidate which includes an incentive to respond to the survey and a unique user name and password for accessing the survey form by the Internet, tailoring the incentive based on the candidate segments;
    (f) distributing the mailing package to each candidate; and
    (g) evaluating the interest of each candidate completing a survey.

2. A method for electronically surveying those candidates who may be interested in an education institution comprising the steps of:
    (a) Obtaining a list of candidates who are believed to have an interest in attending an educational institution;
    (b) developing a data base relating to the candidates;
    (c) using the information in the data base to segment the candidates into one or more candidate segments based on one or more criteria established by the educational institutions;
    (d) establishing an Internet based web page containing a survey form
    (e) e-mailing each candidate from a named individual at an e-mail address which includes the name of the institution a unique user name and password for electronically accessing the survey form and a hyperlink to the survey form and including an incentive to respond to the survey and tailoring the incentive based on the the candidate segments;
    (f) evaluating the interest of each candidate completing a survey.

3. The method of claim 2 wherein the survey form is customized using information from the data base.

4. The method of claim 3 wherein the survey form is customized with graphics as a function preselected candidate information in the data base.

5. The method of claim 4 wherein the information is related to an extracurricular activity.

6. The method of claim 2 wherein the unique identifier is locked out upon completion of the survey to thereby prevent multiple surveys from the same candidate.

7. The method of claim 2 including the further step of following up with a second e-mail a predetermined time after the initial e-mail in the absence of a response.

8. The method of claim 2 including the real time monitoring of the web site; the step of updating a separate reporting web site indicative of cumulative activity of all candidates; and wherein the reporting web site includes the number of candidates responding to each question on the survey.

9. A method for surveying candidates who may be interested in an educational institution comprising the steps of:
    (a) obtaining a list of candidates who are believed to have an interest in attending an education institution;
    (b) developing a data base relating to the candidates;
    (c) using the information in the data base to segment the candidates based on one or more criteria established by the educational institutions;
    (d) establishing an Internet based web page containing a survey form;
    (e) preparing mailing package for each candidate which includes (1) an incentive to respond to the survey, (2) a unique user name and password for accessing the survey form by the Internet, and (3) a postage prepaid response card; tailoring the incentive based on the candidate segments;
    (f) distributing the mailing package to each candidate; and
    (g) e-mailing each candidate from a named individual at an e-mail address which includes the name of the institution a unique user name and password for electronically accessing the survey form and a hyperlink to the survey form; and
    (h) evaluating the interest of each candidate completing a survey.

* * * * *